United States Patent [19]

Bryant

[11] Patent Number: 5,030,173
[45] Date of Patent: Jul. 9, 1991

[54] SPRING LOADED TELESCOPIC TUBE TAKE-UP

[76] Inventor: Charles B. Bryant, 32380 Wildwood Pt. Rd., Hartland, Wis. 53029

[21] Appl. No.: 500,379

[22] Filed: Mar. 28, 1990

[51] Int. Cl.⁵ ............................................. F16H 7/08
[52] U.S. Cl. ..................................... 474/136; 474/138
[58] Field of Search ............... 474/101, 113, 117, 136, 474/138; 73/781, 862.06, 862.38, 862.39, 862.55, 862.58

[56] References Cited

U.S. PATENT DOCUMENTS

| | | | |
|---|---|---|---|
| 2,407,499 | 9/1946 | Klossner | 474/138 X |
| 3,422,692 | 1/1969 | Woodring | 474/136 |
| 3,520,182 | 7/1970 | Kelk et al. | 73/862.55 X |
| 3,832,910 | 9/1974 | Bryant | 474/136 |
| 4,583,961 | 4/1986 | Kawasawa et al. | 474/113 |
| 4,803,804 | 2/1989 | Bryant | 474/113 |
| 4,820,283 | 4/1989 | Schickling et al. | 604/280 |

Primary Examiner—Thuy M. Bui
Attorney, Agent, or Firm—Fuller, Ryan & Hohenfeldt

[57] ABSTRACT

A belt take-up for a conveyor is provided with an internal compression spring to adjustably bias the bearing support tube to control tension on the conveyor belt. A scale on the bearing tube can provide a readout of the tension. A load cell can be employed to control a circuit to stop the conveyor motor when extreme high or low tensions of the belt are sensed.

11 Claims, 2 Drawing Sheets

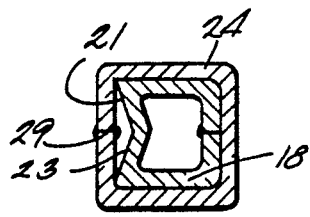
Fig.5
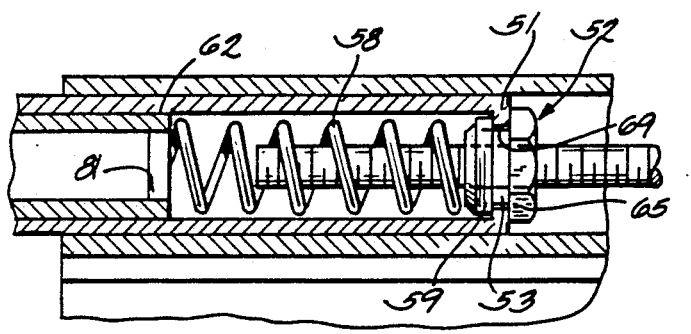
Fig.6
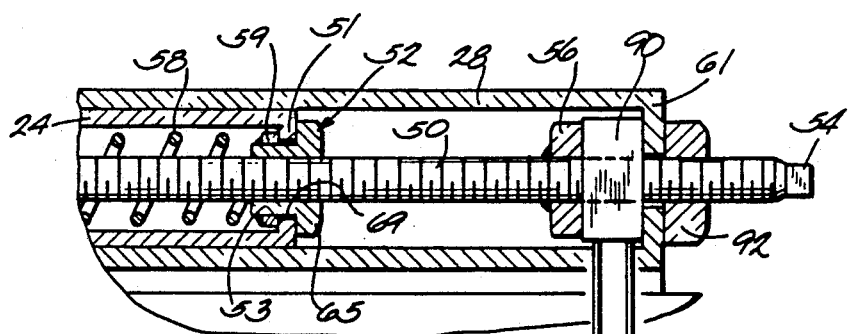
Fig.7
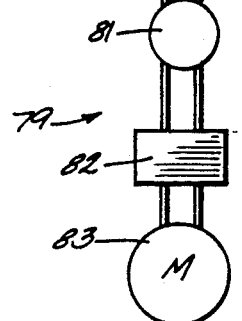

SPRING LOADED TELESCOPIC TUBE TAKE-UP

FIELD OF THE INVENTION

The invention relates to belt take-ups which support bearings for conveyors.

BACKGROUND OF THE INVENTION

The present invention is a further development of the belt take-ups shown in my U.S. Pat. Nos. 3,832,910 and 4,803,804. These belt take-ups provide unyielding support for the bearings which support the pulley shaft. Some belts are stiff, strong and unyielding so that small incremental adjustment of the belt tension can over stress the belt and do major damage. Moreover, small foreign particles getting between the belt and a driver or idler pulley can untrack or destroy the belt. Additionally, product build-up on the pulley surface adversely affects the belt life and stress. Metal belts, in particular, are affected by heating and cooling which can cause contraction or loosening of the belt by expansion.

SUMMARY OF THE INVENTION

A spring loaded belt take-up is provided to overcome these problems. The take-up is provided with a scale for adjusting belts to a predetermined tension. The spring loading also can compensate for the adverse affects of heating and cooling of the belts. The take-up is provided with a visual readout indicating the amount of spring deflection from no load to full load to enable effective tension control on the belt. Rather than utilize a spring, a load cell can be employed with an electric circuit to shut down conveyors if there is too little or too much slack in the belt as sensed by the load cell.

In accordance with the invention, the bearing support tube is telescopically received in an intermediate tube called the slider which contains a spring which bears against the end of the bearing support tube. A floating nut is fixed to the slider tube and a threaded rod causes movement of the nut and the slider tube to compress or release tension on the spring as the threaded rod is rotated. A third outer tube, called the body, supports the threaded rod adjuster for rotation and telescopically receives the bearing support and slider tubes. The indicia for readout on spring tension is provided on the exposed end of the bearing support tube. The end of the slider tube can be used as the pointer or bench mark for reading the scale.

Further objects, advantages and features of the invention will become apparent from the disclosure.

DESCRIPTION OF THE DRAWINGS

FIG. 5 is a cross-section of a modified embodiment of the bearing tube.

FIG. 6 is an enlarged fragmentary sectional view of the assembly of the spring.

FIG. 7 is a view similar to FIG. 4 with a different orientation of the load cell.

DESCRIPTION OF A PREFERRED EMBODIMENT

Figure 1:
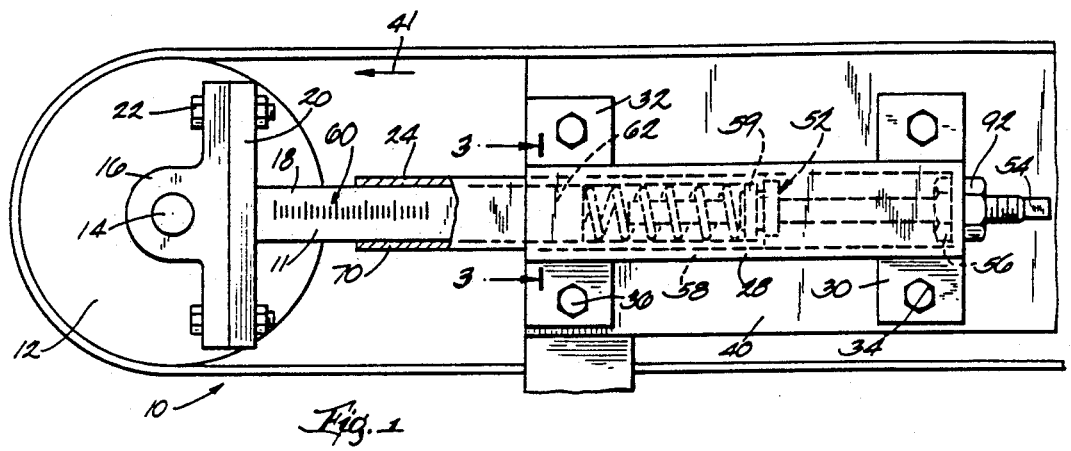
FIG. 1 is a side elevational view of a belt take-up in accordance with the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings a belt 10 is shown which is supported on an idler pulley 12 having a shaft 14 supported in a bearing block 16.

Figures 3, 4:
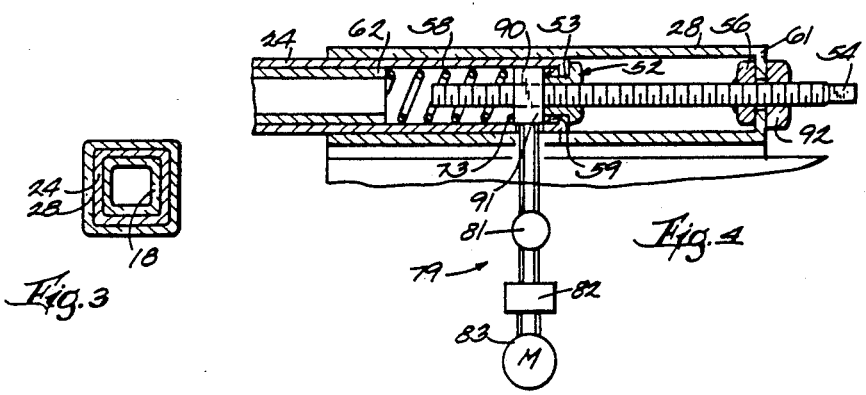
FIG. 3 is a sectional view along line 3—3 of FIG. 1.
FIG. 4 is a diagrammatic view of a modified embodiment.

The belt take-up of the invention includes a bearing support tube 18 which has a mounting plate 20 fixed to the bearing by bolts 22. The bearing tube 18 is telescopically received in a slider tube 24 which is supported for recti-linear movement in a third tube outer support tube 28. The tube 24 fits into the inside or within the internal cross-section of the tube 28. In a modified embodiment the tube 18 is provided with a side wall having two inclined side wall sections 21, 23 which form a recess 27. This recess 27 accommodates and provides clearance for a weld bead or flash 29 which is formed at the joint of the edges of the metal when the tube is formed. The recess 27 can be provided with tension indicia 60 as hereinafter described. The indicia may be imprinted on an adhesive label and affixed to the surfaces 21, 23 within the outline of the tube so the label will not be scraped away by the outer tube 24 during adjustment of the tension on the bearing support which cause relative movement of the edge 70 of the slider 24 along the gradations or indicia 60. The tube 28 is provided with mounting flanges 30 and 32 which are welded to the side of the tube 28 and can be secured by bolts 34 and 36 to the conveyor metal side frame 40. In the disclosed construction, the tubes 18, 24 and 28 have a square cross-section as shown in FIG. 3. However, round tubes with keyways or other interfitting geometric cross-section to prevent relative rotation can be utilized.

Figure 2:
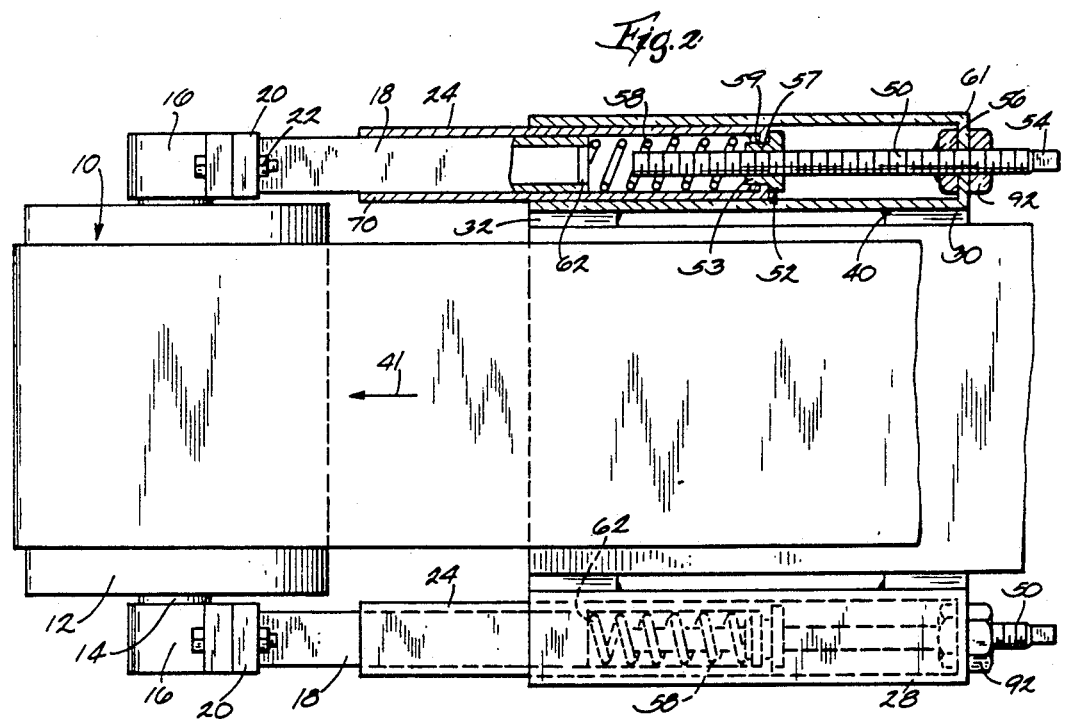
FIG. 2 is a top view showing two belt take-ups, one in fragmentary section.

In accordance with the invention, adjustment means are provided for adjustably biasing the bearing tube 18 in the direction of arrow 41, FIGS. 1 and 2. In the disclosed construction, the adjustment means comprises a threaded rod 50 and a nut 52 having a reduced diameter boss 53 extending therefrom. Reduced boss 53 is placed in hole 57. Then plate 59 is welded to boss 53. The nut is thus loosely fitted into the tube 24. However, the fit of plate 59 in the tube 24 prevents rotation of the nut. A square end 54 can be provided on the end of threaded rod for use with a wrench for tightening or loosening the threaded rod 50.

A nut 56 is threaded on the rod 50 and welded to the rod 50 and located within the end wall 61 of body tube 28. The nut 56 bears against tube end wall 61. Biasing pressure is afforded by a spring 58 located within the tube 24. The spring bears against the lock plate 59 of the floating nut assembly 52 and the end 62 of the bearing support tube 18 to bias the tube 18 in the direction of arrow 41. A lock nut is provided on the threaded rod 50 outside the end wall 61. A lock plate 59 is welded on the projecting hub 53 on the nut 52. The hub 53 projects through an aperture 69 in the end wall 51 of the slider tube 24. The aperture 69 is sized to provide a loose fit on the hub 53. The lock plate 59, hub 53 and nut 52 thus provide a loose threaded support for the rod 50 to avoid misalignment problems and assure smooth rotational adjustment of the rod 50. The spring bears between the end wall 62 and on the lock plate 59 of the floating nut assembly 52. Thus, the bias load goes directly from the spring to the adjuster rod 50. The tube 24 simply encloses the spring and serves as a shroud. The tube 24 also provides support for bearing tube 18 and functions as a tube container and thread protector. In this regard the end wall 62 is provided with an aperture 61 for lubrication access.

A scale 60 can be provided on the bearing tube 18 with the scale readout occurring at the end 70 of the tube 24. The scale 60 is desirably numbered on the face 11 as shown in FIG. 1. Then the scale will be in the correct orientation for use on either side of the conveyor.

In use of the belt tensioner rotational movement of the screw 50 by applying torque to the end 54 will cause movement of the tube 24 to compress or release tension on the spring. The corresponding force is applied to the end 62 of the tube as shown in FIG. 2.

In an alternate construction as shown in FIG. 4, a load cell 90 is located between the nut 52 and the end 73 of the spring 58. The load cell 90 is electrically connected to a circuit means 79 which can include an electric meter 81 to provide a visual readout of the state of compression of the spring and load cell. The load cell 90 can be provided with an aperture 91 (FIGS. 4 and 7). The circuit 79 can include a motor controller 82 which can interrupt the circuit to the motor 83 when the belt is at a pre-selected high or low tension value. FIG. 7 shows the load cell 90 between the end wall 61 of tube 28 and the nut 56. In this arrangement connection of the circuit wires to the load cell is more convenient.

I claim:

1. A belt take-up including a bearing support tube, a slider tube and a body tube, said bearing support tube interfitting in said slider tube to provide relative longitudinal movement but not rotational movement, said bearing support tube having an end and being telescopically and reciprocally received in said slider tube with said bearing support tube and said slider tube being supported in said body and including means for adjustably biasing the bearing support tube and wherein said means for adjustably biasing said bearing support tube comprises a threaded rod having a free end, means for rotatably supporting the threaded rod in said body tube and for limiting axial movement of said rod, a nut threadably received on said rod and secured to said slider tube and a spring between said nut and said bearing support tube and telescoped over said threaded rod and said spring engaging said bearing support tube end which is spaced from the end of said bearing support tube to provide clearance for adjustment of said threaded rod to afford the bearing tube to float against the spring bias in a recti-linear path during tension on the belt so that rotation of said threaded rod causes movement of said nut and said slider tube to compress or reduce the compression of said spring and thereby vary the compression on said bearing support tube.

2. The belt take-up of claim 1 wherein said means for adjustably biasing said bearing support tube comprises a threaded rod, means for rotatably supporting the threaded rod in said body tube and for limiting axial movement of said rod, and nut threadably received on said rod and secured to said slider tube and a spring between said nut and said bearing support tube so that rotation of said threaded rod causes movement of said nut and said slider tube to compress or reduce the compression of said spring and thereby vary the compression on said bearing support tube and its bearing.

3. The belt take-up of claim 1 wherein said means for adjustably biasing said bearing support tube includes a load cell and circuit means connected to said load cell to provide a visual readout of the state of said load cell,
means for supporting said load cell within said body tube in a position to react to the compressive forces on said bearing support tube.

4. A belt take-up in accordance with claim 3 wherein said load cell has a central aperture and is located within said slider tube said slider tube having a threaded end member and said load cell being located between said end member of said slider tube and the end of said bearing tube and being arranged around said threaded rod.

5. A belt take-up in accordance with claim 3 wherein said load cell is located within said slider tube and between an end of said spring and the nut assembly.

6. A belt take-up in accordance with claim 1 wherein said bearing support tube has a scale with indicia for readout of the compressive force on said bearing support tube when under load.

7. A belt take-up including a bearing support tube, a slider tube and an outer body tube, said bearing support tube interfitting in said slider tube to provide relative longitudinal movement but not rotational movement, said bearing support tube being telescopically and reciprocally received in said slider tube with said bearing support tube and said slider tube being supported in said outer tube and including means within said body tube for adjustably biasing the bearing support tube to provide a predetermined compressive load on said belt take-up.

8. The belt take-up of claim 7 wherein said means for adjustably biasing said bearing support tube comprises a threaded rod, means for rotatably supporting the threaded rod in said body tube and for limiting axial movement of said rod, a nut threadably received on said rod and secured to said slider tube and a spring between said nut and said bearing support tube so that rotation of said threaded rod causes movement of said nut and said slider tube to compress or reduce the compression of said spring and thereby vary the tension on said bearing support tube and enable the bearing tube to float back and forth in response to changes in belt tension.

9. The belt take-up of claim 3 including a second belt take-up both of said belt take-ups in combination with a motor driven conveyor having bearing blocks connected to said belt take-up bearing support tubes, a shaft with a pulley rotatably supported in said bearing blocks, a conveyor frame for supporting the belt take-ups and a conveyor belt arranged around said pulley whereby said means for adjustably biasing the bearing support tubes in said belt take-ups affords belt tension adjustment and circuit means connecting said load cell to a switch to change the state of equipment associated with the conveyor assembly if the tension in the belt attains a pre-selected level.

10. The combination of claim 9 including indicia on said bearing support tubes to measure the tension on said belt.

11. A belt take-up according to claim 7 wherein said slider tube has an end which telescopes over an exposed portion of said bearing support tube during adjustment of said biasing means and a scale on said exposed portion which cooperates with said slider tube end to provide a visual read out of the bearing force on said bearing tube.

* * * * *